May 20, 1930. A. BRANTINGHAM 1,759,036
WELDING FIXTURE
Filed Oct. 31, 1927 2 Sheets-Sheet 1

INVENTOR
By Alan Brantingham
Wilson & McCanna
ATTY'S

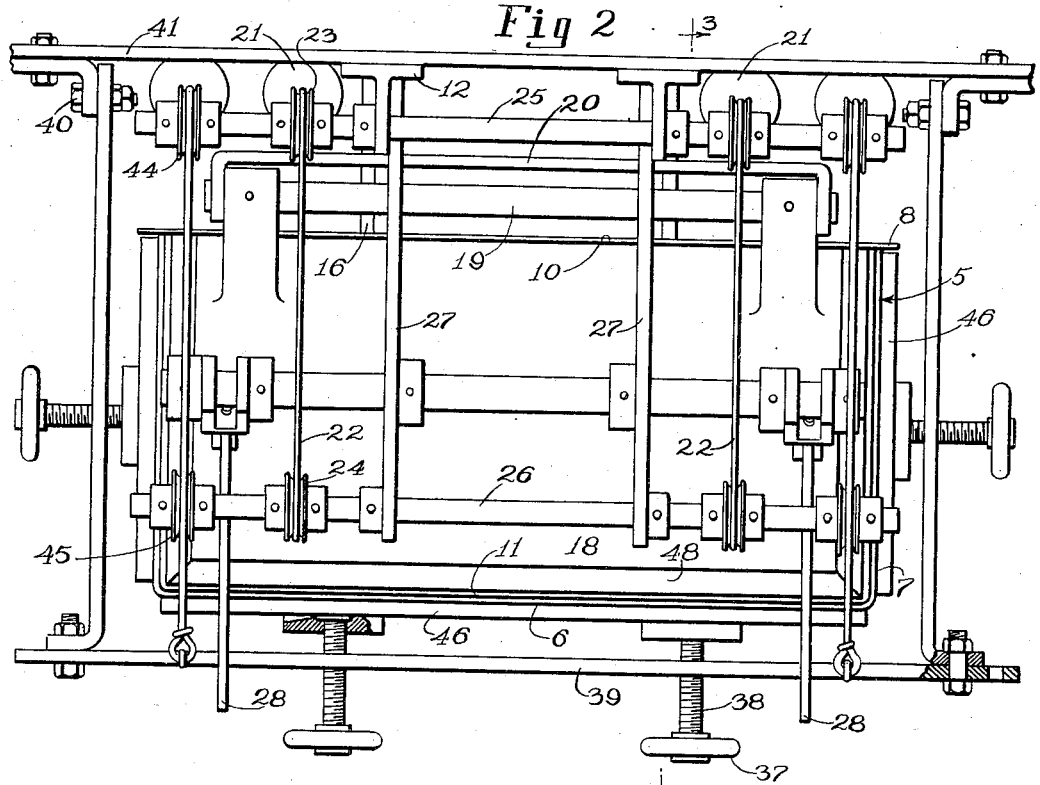
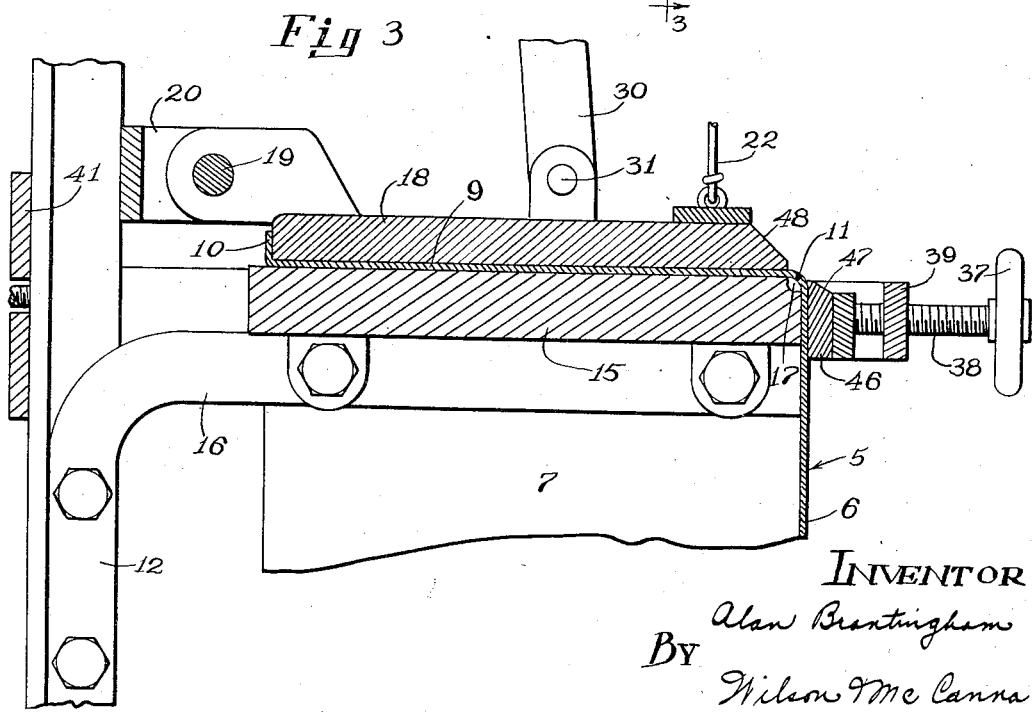

Patented May 20, 1930

1,759,036

UNITED STATES PATENT OFFICE

ALAN BRANTINGHAM, OF ROCKFORD, ILLINOIS, ASSIGNOR TO EMERSON-BRANTINGHAM CORPORATION, OF ROCKFORD, ILLINOIS, A CORPORATION OF ILLINOIS

WELDING FIXTURE

Application filed October 31, 1927. Serial No. 229,836.

This invention relates to work holding jigs and fixtures generally but has more particular reference to an improved welding fixture.

The principal object of the invention is to provide a welding fixture which while quick-acting in the gripping and releasing of the work, is so designed that the work is accurately located and held, thus resulting in high grade work and absolute uniformity in size and shape of work in case of quantity production. For example, the present invention as herein disclosed as embodied in a fixture for use in the welding of liners for refrigerators and permits the quantity production of such pieces at extremely low cost, and with relatively unskilled labor, while working as close to size and form as specifications may require.

In the present fixture I provide two templates for the welding of the top and bottom walls of the liner, the one template fitting inside the liner and being fixed while the other template is for the outside and is arranged to be swung into and out of position with respect to the first template. In connection with the swingable outside template I provide counterbalancing means normally acting to raise the template to an out of the way position and also provide a hand-operated toggle linkage whereby the template can be moved quickly into operative position, the cocking of the toggle serving to lock the template in operative position and the breaking of the toggle permitting the template to be retracted quickly under the action of its counterbalancing means. The locking of the swingable template serves to hold the top or bottom wall for the welding operation but the side walls require a separate clamping means, which in the present case I have specially designed not only with a view to the accurate positioning and positive holding of the work but also with a view to permitting the swinging of the clamping means, in like manner to the aforesaid template, to an out of the way position. In other words the fixture is designed throughout to facilitate speedy operation without in any way sacrificing accuracy.

The invention is illustrated in the accompanying drawings, wherein;

Figure 2 is a plan view of Figure 1; and,

Figure 3 is a sectional detail on a slightly enlarged scale taken on the line 3—3 of Figure 2.

The same reference numerals are applied to corresponding parts in the three views.

Figure 1:
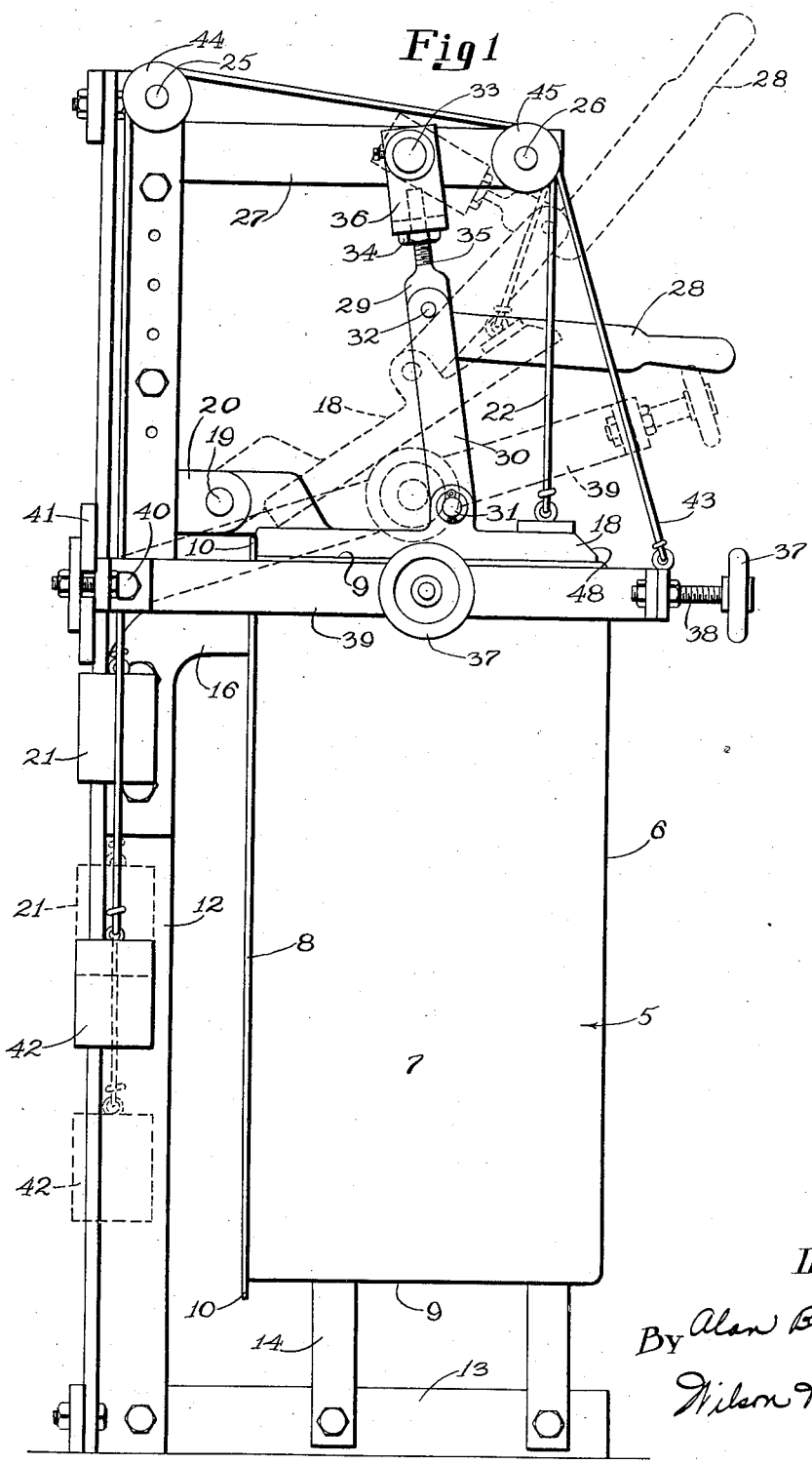
Figure 1 is a side view of a welding fixture shown in operation with a liner in place for welding, dotted line positions being indicated for the parts which are retracted when the work is being placed in the fixture or is being removed therefrom.

The invention, as above stated, is herein disclosed as embodied in a fixture for the welding of sheet metal liners for refrigerators but no limitation should be thereby regarded as imposed on the application of the invention inasmuch as drums, cages, and shells or boxes for various purposes might be handled in a fixture of the present type or in one of a slightly modified form, and so far as the operation to be performed is concerned, it will be evident that the present invention is not necessarily limited to a fixture for use in welding but might be employed to equal advantage for the holding of work to be soldered, bolted, riveted, drilled, etc. In other words the reference to the welding of sheet metal liners for refrigerators is merely for the purpose of illustration. The type of liner selected for the present purposes and generally designated in the drawings by the reference numeral 5 has the back and side walls 6 and 7 respectively formed preferably in one piece, the side walls having an out-turned flange 8 at the front of the liner to serve in the fastening of the liner in the refrigerator box. The top and bottom walls indicated by the reference numeral 9 are provided in two separate pieces flanged outwardly at the front, as indicated at 10 in line with the flanges 8 of the side walls. The right angle notches left at the corners between the ends of the flanges 8 and 10 are filled in in any usual or preferred manner.

The present fixture is designed for the purpose of accurately locating and positively holding to proper relation to one another the body portion of the liner, and the top or bottom wall of said liner, during the performance of the welding operation, the weld being indicated in the drawing by the reference numeral 11 as a butt-weld and being performed suitably with an oxy-acetylene welding torch. As also indicated in the drawing the edges of the pieces to be welded left exposed in the fixture are hammered into alignment and the weld 11 closes the crevice left therebetween and results in rounded corners as indicated in the drawing. Two welding operations are obviously involved in the making of each liner, the top wall being welded in one operation and the bottom wall in another.

The fixture comprises an upright frame 12 suitably built up of angle iron pieces having a base 13 on which supports 14 are provided whereon the liners are rested when placed in the fixture. The supports may or may not be of a form to provide for a change in elevation for different sized work. A template 15 is supported on the frame 12 on brackets 16 reaching outwardly from the frame over the supports 14. The template 15 is made accurately to size to fit neatly between the side walls 7 of the body portion of the liner and will square up the back wall with the side walls when the piece is clamped in place for the welding operation. The flat top of the template also provides a seat for the top or bottom wall 9 which is trued up and held in proper relation to the rest of the liner when the same is properly clamped for the welding operation. The edges of the template 15 are rabbeted, as indicated at 17 in Fig. 3, so as to give enough clearance to permit of the hammering in of the edges of the work and the welding thereof in the manner above described, and furthermore to avoid any likelihood of the liner being welded to the template in the welding operation. Another template 18, hereinafter referred to as the outside template in order to distinguish it from the inside template 15, is made accurately to size so that it locates the top or bottom wall 9 accurately with respect to the body portion of the liner with the flange 10 in absolute alignment with flanges 8. The outside template is mounted for swinging movement on a pintle 19 carried on a bracket 20 fixed to the frame 12 and has counterweights 21 arranged normally to move the same to a raised retracted position as indicated in dotted lines in Fig. 1. The weights 21 are connected with the template through cables 22 passed over pulleys 23 and 24 provided on shafts 25 and 26 respectively mounted directly on the frame 12 and on brackets 27 reaching forwardly from the frame. The outside template is arranged to be lowered to its operative position against the action of the counter-weights 21 by the operation of handles 28 from the dotted line position shown in Fig. 1 to the full line position. The handles 28 are provided as integral extensions of links 29 which with companion links 30 provide toggles for the quick movement of the template from retracted position to operative position and the locking of the same in the operative position. The links 30 are pivotally connected to the template 18 at 31 and are pivoted to the links 29 at 32. The links 29, as shown, are pivoted to the brackets 27 at 33. Obviously when the pivots 31, 32 and 33 are in dead center relation, or near it, the outside template 18 is positively locked in operative position clamping the top or bottom wall 9 between it and the inside template 15. The clamping pressure may be adjusted to a fine degree by the turning of nuts 34 on the threaded shanks 35 of the links 29, the links 29 being pivoted at 33 through clevises 36 wherein the shanks 35 are engaged as illustrated. It will be apparent that the cocking of the toggle throws the outside template in place with extreme rapidity and that the breaking of the toggle permits the retracting of the template under the action of its counterweights with extreme rapidity. The work can therefore be cleared quickly when the welding operation is finished and no time will be lost in removing the work from the fixture. In the placing of the work the swinging of the outside template is ordinarily taken advantage of by the operator to assist in the locating of the top or bottom wall 9 by allowing the flange 10 to be engaged by the template near the end of its downward movement. The template then serves to move the work piece toward its proper position, thus avoiding any difficulty in the accurate location thereof.

The body portion of the liner is arranged to be clamped to the inside template 15 by the turning of hand wheels 37 which operate screws 38 in a frame 39. The latter is arranged to extend around the template and in spaced relation thereto so that the body portion of the liner is received therebetween (see Fig. 3). The frame 39, as indicated in Fig. 1, is moved from the retracted position indicated in dotted lines to the operative position shown in full lines after the body portion of the liner has been placed in the fixture and is ready to be clamped to the inside template, the frame 39 being pivoted to the main supporting frame 12 at 40 on cross members 41. The frame 39 with all of the parts carried thereby is counterbalanced by weights 42 connected to the frame by cables 43 operating over pulleys 44 and 45 on the shafts 25 and 26 respectively. The frame therefore has to be moved downwardly against the action of the counterweights and is held in the operative position when the hand wheels 37 are turned to apply the clamps. The latter consists of pads 46 in which the inner ends of the screws 38 are swiveled (see Fig. 2). The upper edges of the pads 46, and the sides of the template 18 are beveled off as indicated at 47 and 48 respectively, in Fig. 3. This leaves the edges of the work amply exposed for hammering before the welding operation. It will no doubt be clear from the foregoing that the clamping frame 39 is quickly retractable from the work as soon as the welding operation is completed. There is therefore no occasion for delay in the removal of the finished work from the fixture.

It is believed the foregoing description gives a full understanding of my invention and all of its advantages. It should be understood that while the invention has been described as applied to one particular embodiment the same is not to be considered as limited to the special construction shown, inasmuch as those skilled in the art will readily perceive of many variations or modifications for the adaptation of the invention to other work, and purposes than that herein described, all of which are to be considered as embraced within the appended claims.

I claim:

1. In a welding fixture the combination of a pair of templates, the one of which is arranged to fit inside the work and the other outside the work, a clamping frame extending around the inside template and in spaced relation thereto so as to permit the introduction of the end of a hollow box-like work piece therebetween about the template, clamping means on said frame for securing the work piece to the template at the edge portions thereof, the edges of the workpiece being slightly exposed for the welding operation, the outside template being superposed on the inside template with another work piece therebetween, the latter work piece being arranged to serve as an end closure for the first mentioned work piece, and means for clamping the templates together to hold the work pieces so that their edges are in adjoining relation the edges of the second mentioned work piece being likewise exposed for the welding operation.

2. A welding fixture as set forth in claim 1 including a supporting frame for fixedly mounting the inside template and for swingably mounting the outside template for movement toward and away from the inside template to facilitate the placing and the removing of the work, and wherein the clamping frame is swingably mounted on the supporting frame for movement into and out of operative position with relation to the inside template.

3. A fixture of the character described comprising a main frame having a work support thereon, a template mounted on said frame above the work support and arranged to have a hollow box-like work piece fitted about the same and resting on the work support, a clamping frame having means for clamping the work piece on the outside of the template, a second template mounted on said frame for movement toward and away from the first template and arranged to receive another work piece therebetween, the said work piece being of such form to serve as a wall for the first work piece and when held between the templates being arranged to have its edges disposed in adjoining relation with the walls of the first work piece, the second template being pivoted on the frame for swinging movement toward and away from the first template so as to facilitate the placing and the removal of the work, means arranged to cause a quick movement of the template into operative position and for holding the same in such position comprising a pair of toggle links connected between the frame and said template, one of said toggle links having an operating handle extending therefrom by means of which the toggle may be cocked or broken, the template with the toggle cocked serving to clamp a part of the work and with the toggle broken being arranged to be moved to a retracted position.

4. A fixture of the character described comprising a main frame having a work support thereon, a template mounted on said frame above the work support and arranged to have a hollow box-like work piece fitted about the same and resting on the work support, a clamping frame having means for clamping the work piece on the outside of the template, a second template mounted on said frame for movement toward and away from the first template and arranged to receive another work piece therebetween, the said work piece being of such form to serve as a wall for the first work piece and when held between the templates being arranged to have its edges disposed in adjoining relation with the walls of the first work piece, the clamping frame comprising a frame mounted for swinging movement relative to the first template whereby to permit movement thereof to a retracted position, said frame being arranged in the operative position thereof to extend around the outside of the template and in spaced relation thereto and having devices thereon for clamping a part of the work against the outside of the template.

5. A fixture of the character described comprising a main frame having a work support thereon, a template mounted on said frame above the work support and arranged to have a hollow box-like work piece fitted about the same and resting on the work support, a clamping frame having means for clamping the work piece on the outside of the template, a second template mounted on said frame for movement toward and away from the first template and arranged to receive another work piece therebetween, the said work piece being of such form to serve as a wall for the first work piece and when held between the templates being arranged to have its edges disposed in adjoining relation with the walls of the first work piece, the clamping frame and clamping means comprising a frame mounted for swinging movement relative to the first template whereby to permit movement thereof to a retracted position, said frame being arranged in the operative position thereof to extend around the outside of the template and in spaced relation thereto and having devices thereon for clamping a part of the work against the outside of the template, counterbalancing means for normally moving said clamping frame to its retracted position whereby immediately upon the loosening of the clamping devices from engagement with the work the clamping frame will be moved to a retracted position.

In witness of the foregoing I affix my signature.

ALAN BRANTINGHAM.